United States Patent [19]
Ament

[11] Patent Number: 5,437,474
[45] Date of Patent: Aug. 1, 1995

[54] SAFETY-NET CONSTRUCTION, PARTICULARLY FOR USE IN MOTOR VEHICLES

[75] Inventor: Eduard Ament, Aichwald, Germany

[73] Assignee: Baumeister + Ostler GmbH & Co., Aichwald, Germany

[21] Appl. No.: 279,999

[22] Filed: Jul. 25, 1994

[30] Foreign Application Priority Data

Aug. 26, 1993 [DE] Germany .......... 42 28 746.8

[51] Int. Cl.$^6$ ............ B60R 21/06; B60R 21/02; B60P 7/06
[52] U.S. Cl. .................... 280/749; 410/118
[58] Field of Search ............ 280/749, 748; 410/118

[56] References Cited

U.S. PATENT DOCUMENTS

| | | | |
|---|---|---|---|
| 3,099,313 | 7/1963 | Peck et al. | 410/118 |
| 3,695,698 | 10/1972 | Trump | 280/749 |
| 4,368,902 | 1/1983 | McDowell | 280/749 |
| 4,906,020 | 3/1990 | Haberer | 280/749 |
| 5,026,231 | 6/1991 | Moore | 280/749 |

FOREIGN PATENT DOCUMENTS

| | | |
|---|---|---|
| 2562007 | 10/1985 | France . |
| 2050331 | 4/1972 | Germany . |
| 2221427 | 11/1973 | Germany . |
| 4010209 | 10/1991 | Germany . |

OTHER PUBLICATIONS

ATZ—Automobiltechnische Zeitschrift 88 (Nov. 86), Nov. 11, "Schutz der Insassen vor Eindringender Ladung beim Unfall", pp. 641–648.

*Primary Examiner*—Kenneth R. Rice
*Attorney, Agent, or Firm*—Frishauf, Holtz, Goodman & Woodward

[57] ABSTRACT

The safety net is adapted to be mounted in a motor vehicle such as a stationwagon, van or the like, to separate a passenger compartment in the motor vehicle from a cargo compartment and prevent injury to passengers in the passenger compartment upon abrupt deceleration of the vehicle, for example due to a frontal collision or the like, by preventing flying objects such as suitcases (9) from reaching the passenger compartment. To prevent tearing of the net if the body of the vehicle is deformed so that the net, stretched between the roof and the backseat or bottom of the cargo compartment, is excessively stressed, the net is formed with a tear prevention arrangement which includes a net size expansion compensation arrangement (17) in the form of a fold, for example a zig-zag fold, seamed into the net and held in position by a frangible, stitched seam line (31, 34), which can tear upon substantial stresses placed on the net. Thus, the effective length of the net between the passenger and cargo compartments can expand to compensate for vehicular deformation, deformation of holding rods (18, 21), rollers (18a) or the like.

18 Claims, 3 Drawing Sheets

SAFETY-NET CONSTRUCTION, PARTICULARLY FOR USE IN MOTOR VEHICLES

FIELD OF THE INVENTION

The present invention relates to a safety-net construction, and more particularly to a safety net adapted to be placed between a cargo compartment and a passenger compartment of a motor vehicle to protect passengers in the vehicle with respect to flying cargo in case of a collision, and especially to such a construction which is sturdy and reliable and resists tearing even under high g-forces of flying objects.

BACKGROUND

Many types of vehicles have cargo spaces which are open towards passenger spaces, for example stationwagons, combination vans, and the like. Usually, a division is provided formed in the lower portion of the back of the rearmost seats. The region between the upper edge of the rearmost seats and the roof is usually free. The danger, thus, arises that in a head-on collision, loose objects from the cargo space can be flung forwardly into the passenger space and cause severe injuries in the passenger space. The referenced German Patent DE-A 40 10 209, Ament, assigned to the assignee of the present application, describes a safety-net arrangement which, in a region adjacent the upper edge of the back seat includes a housing retaining a rotatable roller on which an essentially trapeze-shaped safety net is secured. An edge of the safety net, parallel to the roller, is secured to a cross rod or cross bar which can be hooked into a suitable engagement hook underneath the roof of the vehicle. The rod is formed with mushroom-shaped extended ends which fit into suitable reception pockets or reception hooks beneath the roof, and can be hung into these reception pockets when the net is to be extended between the passenger and the cargo compartments. The net is held stretched between the upper edge of the rearmost seat back and the roof. Damping elements are provided in the rods retaining the net, to absorb energy from objects which may be flung forwardly from the cargo space, and to prevent tearing of the safety net under the impact forces.

It has been found that in a number of collisions or accidents, the body of the vehicle or the attachment arrangement of the net will cause peaks of stress applied against the net, particularly at the edges thereof which cause the net to tear, especially at the sides and where the net is attached to the cross rod or the roller, respectively, or to sever the net from its attachment from the roller and rod. If the net severs from its attachment elements, the safety afforded by the net is lost.

THE INVENTION

It is an object to improve a structure described generally above in which, even upon deformation of the body of the vehicle, or high impacts, the net and its attachment to the attachment rod or roller will retain its integrity, so that it will be effective to protect passengers in a passenger compartment of the vehicle under all conditions.

Briefly, the net is formed with a tearing protection arrangement to increase the size of the net in case of abrupt deceleration, for example due to a severe collision of the vehicle, which protection arrangement provides for compensation of the size of the net under impact. The net can change shape or size, from a first size under quiescent compressed state to a second operated or expanded state, so that, in effect, the size of the net between the holding roller and the cross rod or bar can be increased under heavy impact. A stress-sensitive or stress responsive locking arrangement holds the net size expansion compensation portion normally in the first compressed state, but is capable of releasing the net size compensation arrangement to the operated or expanded state and thereby increase the effective size of the net under severe stress.

In accordance with a preferred feature of the invention, the net is formed with one or more folds extending essentially transversely of the vehicle, when installed, and retained in folded position by a tearable or releasable seam.

The arrangement, in accordance with the invention, between the attachment devices, such as the roller and the cross rod, and the net itself is, in effect, a length compensation or extension arrangement. Thus, even under increases in the distance between the attachment devices, for example due to deformation of the vehicle under conditions of a collision, the net cannot tear off its attachment devices, or tear through. Rather, the releasable locking arrangement will permit the length compensation arrangement to respond, making the net, in effect, larger, so that it can fit the space required between the attachment devices, or accept excessive stress, even after the vehicle body has been deformed.

Under normal conditions, the net size expansion compensation arrangement is compressed or folded together and fixed in position in this condition. Thus, the safety net can be used like any other net, and is compatible and can replace the net arrangement of known constructions, that is, net systems without the length compensation arrangement. The length compensation arrangement becomes effective only in case of an accident, permitting the additional material within the length compensation arrangement to be released to permit matching the size of the net to then existing size of the vehicle, for example after having been severely deformed in an accident.

In accordance with a feature of the invention, one or more folds can be located adjacent either the upper or lower attachment arrangements of the net, or at both the upper and the lower attachment of the net, or at other locations within the length dimension of the net.

In accordance with a particularly simple arrangement, a textile strip, the length of which corresponds to the width of the safety net, is seamed with a longitudinal edge to the safety net and leads from there to the attachment device, for example the roller, the cross rod or bar holding the net adjacent the roof of the vehicle, or at both sides. The strip then is led back to the net and then formed, across the length of the net, with a fold or loop, led back to the net. The fold, thus, can be hidden in the interior between the layers of the strip.

The outer contour of the safety net deforms somewhat in cushion or pillow shape in case of an accident. It would, theoretically, be sufficient if the net size expansion compensation arrangement were located only at the outer corners of the net. For simplicity of manufacture, however, it is preferred to extend the net size expansion compensation arrangement or fold, or folds, over the over entire width of the safety net.

In dependence on the size of the vehicle, and the deformation of the body which could be expected in case of an accident—which depends on the construction of the vehicle itself—it is possible to locate the net size expansion compensation arrangement along one or both parallel longitudinal edges of the net, in the region where excessive length is required in case of deformation of the vehicle body.

A particularly simple net size compensation arrangement is formed by a flexible textile structure folded in at least one fold. The releasable locking arrangement is provided to permit the fold to extend only if the material which is stored within the fold is actually required to extend the length of the net. The textile material can also be a foil-type material or a textile web material, preferably a woven material. The locking arrangement preferably is a textile stitched seam, but it could also be an adhesive strip or the like in which the one or more layers formed by the fold are held together until the seam is excessively stressed, thereby permitting release of the folds to extend the size of the net.

A textile stitched seam is preferred with respect to an adhesive connection since it is resistant to aging. In an adhesive connection, aging can change the adhesive characteristics with respect to the holding power; some adhesive will increase their adhesion strength under aging; other adhesives may dry out and the adhesive strength will decrease. If the holding strength of the releasable adhesive seam decreases, the fold might open prematurely; if the adhesive strength increases excessively, the fold may resist opening, so that the effect of the length compensation is lost.

The net is held in position similar to prior art arrangements, for example by a cross rod, cross beam or cross bar extending over essentially the entire width of the vehicle, and hence over the width of the net. This cross rod or cross bar can be hooked into a suitable reception holder formed in or attached to the body of the vehicle. The other edge of the net can be secured to a wind-up roller, as known from the prior art.

DRAWINGS

DETAILED DESCRIPTION

Figure 1:
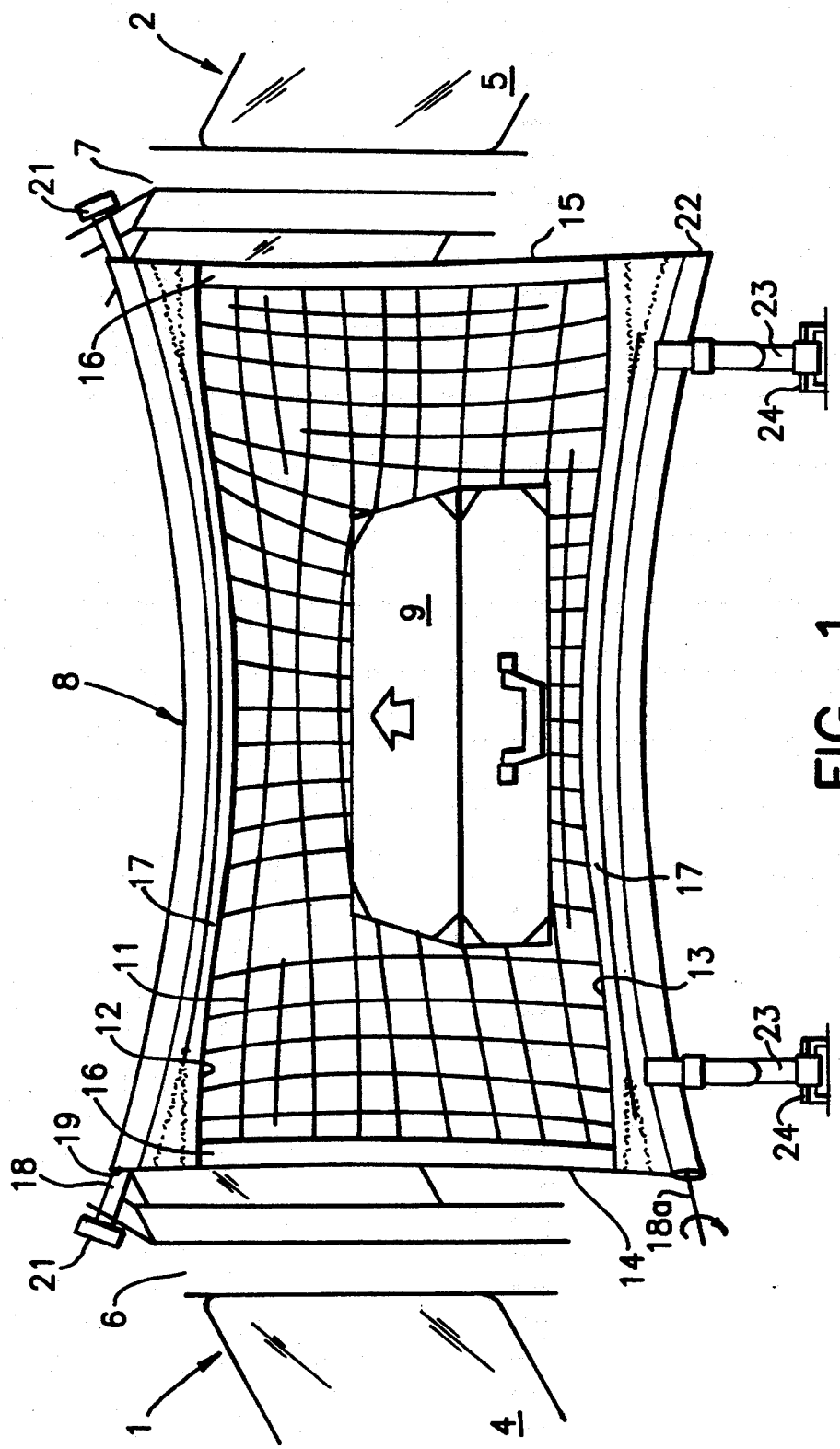
FIG. 1 is a pictorial and highly schematic view of the safety net arrangement in accordance with the present invention, looking from the cargo compartment of the vehicle towards the passenger compartment during a collision.

The invention will be explained, by way of example, for a safety net for a stationwagon. FIG. 1 is a highly schematic view from the cargo compartment of a stationwagon. The right and left walls of the cargo compartment are shown only schematically at 1 and 2, with side windows 4, 5. Posts or uprights 6, 7, shown only schematically, are located in the transition region between the cargo compartment and the passenger compartment. A safety net arrangement 8 is located in the zone where the cargo compartment and the passengers compartment merge, that is, roughly at the level of the posts 6, 7. The safety net 8 separates the passenger compartment to prevent penetration of objects from the cargo compartment into the passenger compartment in case of a front-end collision, or other abrupt deceleration of the vehicle. Large objects, such as a suitcase 9, shown in FIG. 1 only schematically, are caught by the safety net under conditions of deceleration in which, absent the net, objects could fly from the cargo compartment into the passenger compartment causing possibly severe injuries.

The safety net system 8 has an essentially rectangular safety net 11, defining an upper longitudinal edge 12, a lower longitudinal edge 13, and two lateral edges 14, 15. The lateral edges 14, 15 are reinforced by an edge tape 16, seamed to the net.

The net 11 is shown in FIG. 1 to be generally rectangular. Of course, the net can be shaped so that its outer contour is matched to the opening at the transition between the cargo space and the passenger space. Usually, the transition zone, thus, extends between the upper edge of the back of the rear seat up to just beneath the roof of the vehicle. Neither the roof nor the upper edge of the rear seat are shown, since this is not necessary for an understanding of the invention.

To secure the safety net 11 and permit stretching it between the passenger compartment and the cargo compartment, the net is secured to the vehicle by a cylindrical tube or rod 18 which extends laterally from a suitable loop 19 on the net. The ends of the tube 18 are formed with laterally extending mushroom-like knobs 21 which can be secured in suitable pockets formed in the posts 6 and 7 which, for example, may be constructed in form of C-channel rails.

The lower edge 13 of the net is formed with a suitable loop 22 secured to a rod or tube 18a, or the like. Two straps 23, slightly inwardly offset with respect to the lateral edges 14, 15 and anchored in support brackets 24, hold the net in position. The brackets 24 can be secured to the back of the rear seat or to the bottom of the cargo space, as desired.

In accordance with the present invention, a net size expansion compensation arrangement 17 is located in the region of the upper longitudinal edge 12. This arrangement includes the loop 19. Further, another net expansion compensation arrangement 17 is located at the lower edge 13 and also includes the loop 22.

The rod 18 and a corresponding rod at the lower edge 13 are shown bent-through to illustrate the stretching of the net. The bending of the rods is shown exaggerated. Generally, the net should be taut to permit see-through of the vehicle and provide clear vision for the driver through the rear mirror.

Figure 2:
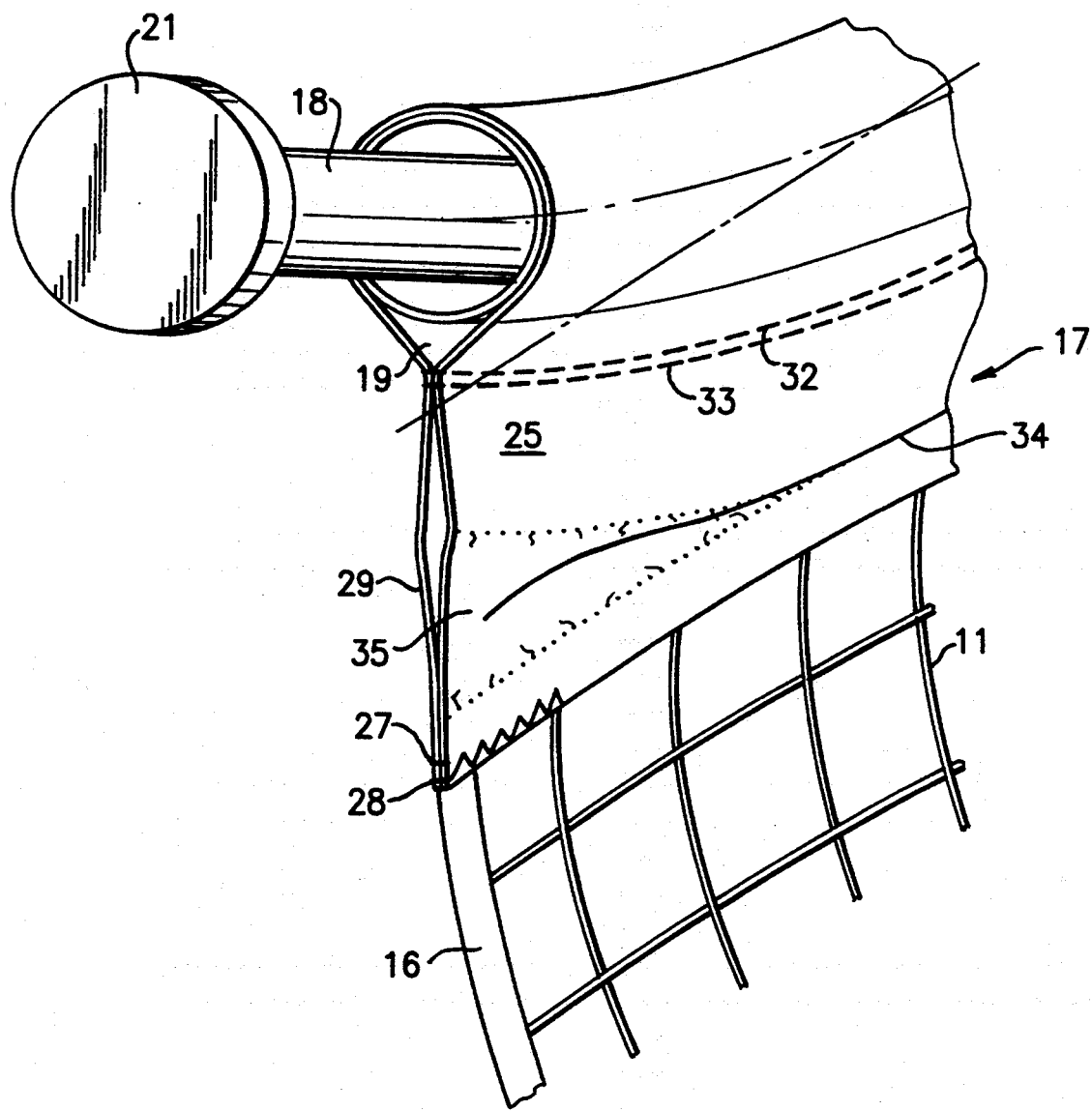
FIG. 2 is a schematic fragmentary pictorial view illustrating the safety net arrangement in accordance with the invention, in operated or expanded condition.
Figure 3:
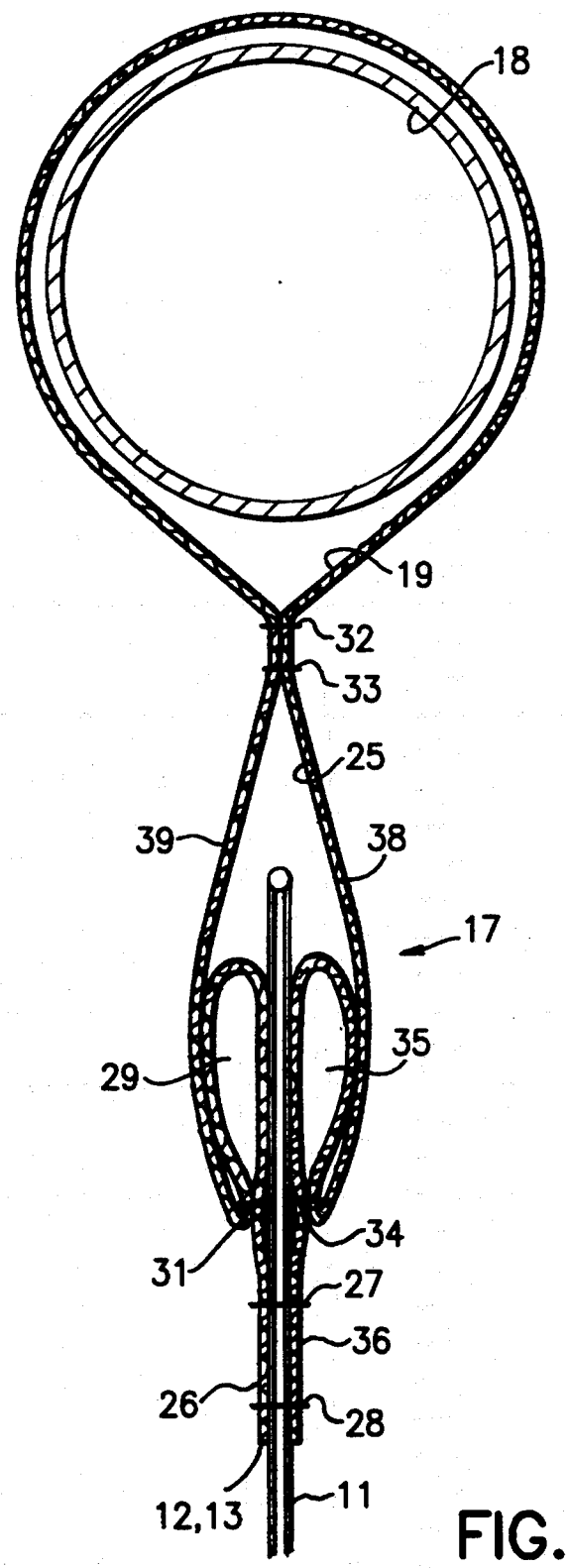
FIG. 3 is a longitudinal sectional view looking at a small edge of the safety net arrangement of FIG. 1 in which the net is in compressed or quiescent state.

The net size expansion compensation arrangement 17 is best seen in FIGS. 2 and 3 which, respectively, show a fragmentary end portion of the net in expanded condition and an end view of the upper portion of the net, in compressed condition, with the tube 18 in section. Of course, the two net size expansion compensation arrangements 17 can be identical, only reversed 180° with respect to each other.

The net size expansion compensation arrangement 17 is formed of a fabric strip 25. One end or edge portion 26 (FIG. 3) is seamed with two strong stitched seams 27, 28 to the adjacent longitudinal edge 12, 13 of the net 11. Starting from the lower edge 26, web 25 extends essentially parallel to the net 11 due to the stitched seams 28, 27. Above the upper seam 27, a gusset or fold 29 is formed, which then leads, by a strip portion parallel to the fold 29, to an upwardly extending part 39 which is guided in form of loop 19 around the tube 18.

In accordance with a feature of the invention, the loop 29 is formed by a stitched seam 31, which is weaker than the seams 27, 28 and can release the fold when a predetermined design stress is exceeded.

The fabric 25, after passing around the tube 18 by about 360°, then extends to a portion 38 The loop formed by the fabric 25 about the tube 18 is secured by two strong seams 32, 33, extending parallel to each other and to the upper edge 12, or the lower edge 13, respectively, of the net 11.

The strip 25 then extends from the lower seam 33 back to the net 11, at a side opposite to that on which the loop 29 was formed. A second loop 35 is formed, secured again by a frangible, stitched seam 34. The size of the loops 29, 35 is about the same.

A smooth ribbon or tape region 36 then extends from the right side—with respect to FIG. 3—of the fabric strip 25, overlapping the region 26 of the web 25, and secured to the net 11 by the seams 27, 28 which, preferably, pass through both the portions 26 and 36 of the web 25.

The relative strengths of the respective seams 27, 28, 32, 33 and 31, 34 is so selected that the seams 27, 28 and 32, 33, under stress, will retain their integrity, whereas the seams 31, 34 can tear.

The net size expansion compensation arrangement 17 at the lower edge is, preferably, identical, and only reversed 180° with respect to the illustration of FIG. 3.

As is clearly apparent, material is stored in the folds or gussets 29, 35. With the seams 31, 34 in their original condition and intact, rod 18 has a first predetermined spacing from a fixed point of the safety net 11. The folds 29, 35 are in the interior portion of the web fabric, that is, they are overlapped by the portions 38, 39 of the fabric 25, and thus protected.

The attachment of the net to the bottom of the vehicle can be in accordance with any suitable arrangement, for example by a wind-up roller shown only schematically at 18a, which can be spring-loaded, for example similar to a window shade roller, having however suitable length and strength. The roller can be located within an enclosed housing which is coupled to the vehicle by the straps 23. Since this arrangement is well known, and any other arrangement is equally suitable, it is shown only schematically in FIG. 1.

Manufacture of net size expansion compensation arrangement 17, and attachment to the net 11:

A strong, sturdy strip of fabric is first provided. The width of the strip should be equal to the length between the tape regions 26 and 36 (FIG. 3). The strip 25 is then folded where the fold 29 is to appear, to be doubled over, and at a suitable distance from the free edge of the loop, a straight stitch seam 31 is formed. This seam 31 is made of a stitch having an upper and a lower thread.

Subsequently, or simultaneously, the other end or edge portion of the strip 25 is formed into the loop 35 and at the same distance from the adjacent edge, that is, from the free edge of the tape region 36, the straight seam 34 is formed. Seams 31, 34 can be done in one operation. As a result, a strip of fabric is generated which, adjacent its two free ends extending over the entire length has two closed individual loops 29, 35 on respective sides of the textile material.

The fabric strip 25 is then folded over once more to form the loop 19. The previously formed loops, gussets or folds 29, 35 will then be placed inwardly of the again folded-over regions 38, 39. The two straight seams 32 and 33 are then made.

Finally, the net 11 is introduced between the folds 29, 35, as best seen in FIG. 3. Care has to be taken that the folds 29, 35 face upwardly in the direction of the seams 32, 33. In a preferred form, the stitched seams 31, 34 have been formed individually, and the net is pushed upwardly between the folds 29, 35 for a suitable distance. Then the two strong stitched seams 27, 28 can be made to secure strip 25 to the net 11. The seams 27, 28 can be straight machine-stitched seams, each having an upper and a lower thread.

The foregoing is made, preferably, for both longitudinal edges 12, 13; two rods 18, or a rod and a roller 18a, can then be introduced into the loops 19. The safety net arrangement 8 is then, essentially, finished.

Operation:

Let it be assumed that the safety net system 8, as shown in FIG. 1, is located in a stationwagon which is subject to rapid deceleration, for example due to a traffic accident. Any articles in the cargo compartment which are flung towards the passenger compartment will be caught by the net. The kinetic energy of the articles 9 can be accepted either by the material of the net 11 or in damping and other apparatus located within the tubular rods 18. Such arrangements are known from the prior art, and a literature reference is, for example, German Patent DE-A 40 10 209. Such energy-accepting systems, however, cannot prevent damage to the net 11 if the body of the vehicle is deformed as a consequence of a traffic accident. If such deformation leads to an increase of the distance between the lower brackets 24 (FIG. 1) and those points in which the mushroom-expanded heads 21 of the rod are secured, the net, unless supplied with the size expansion compensation arrangement 17, might tear. Such changes in spacing may also result if the body of the vehicle is not deformed, for example if the rod 18 is bent in parabola shape, or the lower loop 22, coupled to a stiffening or other arrangement at the lower edge of the net 11, is deformed, for example due to impact of an object 9 on the net 11. Under such conditions, tension forces will arise within the net 11 which extend parallel to the lateral edges 14, 15 and thus stress the seams 27, 28, 31, 34, 33 and 32 in vertical direction—with reference to FIG. 3. The strength of the individual seams is so selected that the seams 27, 28 and 32, 33 are strong and retain the net on the fabric 25 or, respectively, hold the fabric 25 in position around the respective rod 18. The two seams 31 and 34, however, can tear so that the fabric strip, under simultaneous stretching and unfolding of the folds 29, 35, effectively becomes longer. The surface of the safety net 11 will, inherently, compensate for the changed distance between the brackets 24 and the ends 21 of the rod 18, secured beneath the roof to the body of the vehicle.

FIG. 2 illustrates how the seams 31, 34 tear, some distance from the respective edge 14, 15. Additional longitudinal stresses are thus isolated from the safety net itself due to opening of the folds 29, 35. The net itself, thus, will not tear and the strong seams 27, 28 likewise will hold the net in position.

Various changes and modifications may be made within the scope of the inventive concept.

It is possible to use only a single fold located intermediate the top edge 12 and bottom edge 13 of the net, which may be in two parts. Rather than forming the loop 19, an arrangement of seams similar to seams 27, 28 can be used. In this manner, a single or double fan fold can be placed in the net secured by one or more tearing seams, similar to seams 31, 34. Such an intermediately positioned net size expansion compensation arrangement should be so located longitudinally of the net that it does not interfere with the see-through feature of the vehicle, or obstruct the rear-mirror view; alternatively, a portion of the net can be gathered which permits elongation the net by tearing of seams which hold the folded portions together, but which can tear under severe impacts or deformation and change of spacing between the attachment brackets 24 and the support arrangements which hold the upper rod 18 with the extension knobs 21 in position.

I claim:

1. Safety net construction, adapted to be mounted in a motor vehicle to separate a cargo space in the vehicle from a passenger compartment therein, and to protect passengers within the passenger compartment with respect to flying objects from the cargo space of the vehicle in case of abrupt deceleration of the vehicle, comprising a net (8, 11) having four lateral edges (12, 13, 14, 15);

first attachment means (18a, 22, 23, 24) coupled to the net at a first one (13) of the edges, and adapted for attachment to a first surface of the vehicle;

second attachment means (18, 21) coupled to the net at a second one (12) of said lateral edges, and which is essentially parallel to and opposite to said first one of said lateral edges, and adapted to be releasably attached to the vehicle, and to stretch the net (11) across the vehicle, and further comprising, in accordance with the invention, a net tearing protection arrangement which increases the size of the net in case of said abrupt deceleration, said tearing protection arrangement including a net size expansion compensation arrangement (17) changing the shape of the net between a first, quiescent, compressed state and a second, operated, expanded state, said compensation arrangement being coupled to the net at a position intermediate said first and second attachment means; and stress-sensitive and responsive locking means (31, 34) holding the arrangement in said first compressed state while releasing the net size expansion compensation arrangement into at least partially expanded state in case of said abrupt deceleration, to thereby increase the effective size of the net between said first and second attachment means.

2. The safety net of claim 1, wherein said net size expansion compensation arrangement (17) extends at least over a portion along one of said first or second lateral edges (13, 12).

3. The safety net of claim 1, wherein said net size expansion compensation arrangement (17) is located parallel to one of said first and second lateral edges (13, 12).

4. The safety net of claim 1, wherein said net size expansion compensation arrangement (17) extends across the entire width of the net and essentially parallel to said first or second lateral edges (13, 12).

5. The safety net of claim 1, wherein said net size expansion compensation arrangement (17) comprises a flexible foil or fabric, folded to form at least one fold (29, 35)

6. The safety net of claim 5, wherein said net size expansion compensation arrangement (17) comprises a textile web.

7. The safety net of claim 6, wherein the textile web comprises a woven web.

8. The safety net of claim 5, wherein said net size expansion compensation arrangement (17) comprises a net structure.

9. The safety net of claim 1, wherein said stress-sensitive and responsive locking means comprises a frangible seam (31, 34).

10. The safety net of claim 9, wherein said seam is a stitched seam having an upper and a lower thread.

11. The safety net of claim 1, wherein one (18) of said attachment means comprises a rod (18) extending along the second one (12) of said lateral edges, and wherein said net size expansion compensation arrangement (17) is located parallel to said longitudinal edge (12) and extends between the net (11) and said second attachment means.

12. The safety net of claim 1, wherein the first attachment means (18a) comprises a wind-up roller secured to the net (11), said net being secured to said wind-up roller along the first one (13) of said edges.

13. The safety net of claim 1, wherein two net size expansion compensation arrangements (17) are provided, one each located adjacent said first (13) lateral edge and said second (12) lateral edge.

14. The safety net of claim 5, wherein the net size expansion compensation arrangement (17) comprises a web-like strip (25) secured along one of its longitudinal edges (25, 36) to the net (11) and, starting from said lateral edges, extends to the respective attachment means (18, 22), and forms a loop extending around the respective attachment means, and then is led back towards the net (11).

15. The safety net of claim 14, wherein the web is secured to the net by at least one sewn seam (34, 35).

16. The safety net of claim 14, wherein the loop (19) around the attachment means (18) is formed by at least one seam line (32, 33) extending parallel to the respective one of said first and second lateral edges (13, 12).

17. The safety net of claim 14, wherein the net size expansion compensation arrangement (17) is formed of a double-folded fabric strip defining two overlapping end regions (26, 36); and wherein the net (11) is located between said end regions (26, 36) and secured to the end regions by sturdy stitched seams (27, 28).

18. The safety net of claim 14 wherein the net size expansion compensation arrangement (17) is formed into two single fan folds (29, 35), one each located at a respective side of the net, and wherein the material of the fold is positioned inwardly of the portion of the web which extends towards a respective one of the attachment means to protect the fan folds, the web and the fan folds extending over essentially the entire length of the net (11) and being adapted for positioning transversely of said vehicle.

* * * * *